No. 695,892. Patented Mar. 18, 1902.
E. T. STUART.
VERMIN DESTROYING NEST EGG.
(Application filed July 20, 1901.)
(No Model.)
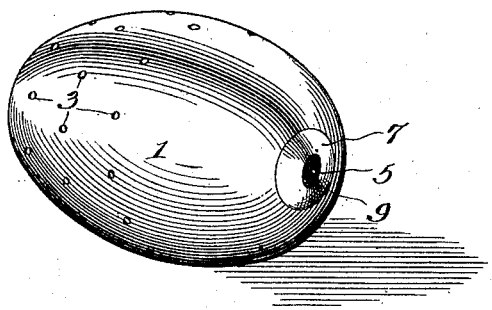
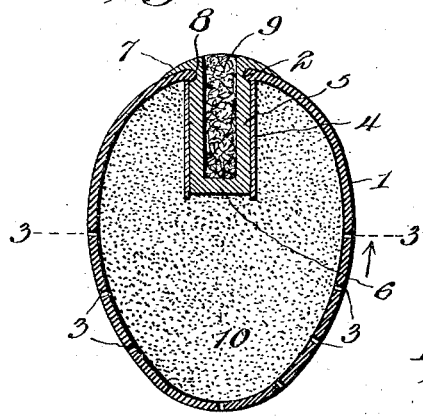
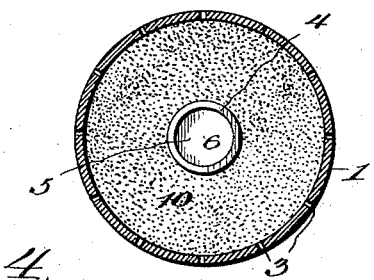
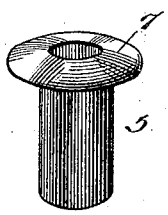
Edwin T. Stuart, Inventor;
Witnesses
Howard D. Orr.
H. J. Shepard.
By E. G. Siggers.
Attorney

UNITED STATES PATENT OFFICE.

EDWIN THOMAS STUART, OF OTTAWA, KANSAS, ASSIGNOR OF ONE-HALF TO JAMES Q. BLODGETT, OF LAHARPE, KANSAS.

VERMIN-DESTROYING NEST-EGG.

SPECIFICATION forming part of Letters Patent No. 695,892, dated March 18, 1902.

Application filed July 20, 1901. Serial No. 69,066. (No model.)

*To all whom it may concern:*

Be it known that I, EDWIN THOMAS STUART, a citizen of the United States, residing at Ottawa, in the county of Franklin and State of Kansas, have invented a new and useful Vermin-Destroying Nest-Egg, of which the following is a specification.

It is a well-known fact that the bodies and nests of domestic fowls are infested with vermin, and in view of this fact it is the essential object of the present invention to provide for effectually supplying an insecticide to the bodies and nests of fowls while the latter are occupying the nests and without disturbing the fowls in any manner whatsoever.

A further object resides in the provision of an improved container for carrying an insecticide in both powdered and liquid form, so that both forms of insecticide may be simultaneously applied.

It is also designed to have the container assume the function of a nest-egg and in addition thereto to be capable of automatically expelling the insecticide by the movement of the fowl upon its nest.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of a nest-egg embodying the present invention. Fig. 2 is a longitudinal sectional view thereof. Fig. 3 is a cross-sectional view. Fig. 4 is a detail perspective view of the hollow closure-plug.

Like characters of reference designate corresponding parts in all the figures of the drawings.

In carrying out the present invention in the embodiment shown in the accompanying drawings it will be seen that the container-body 1 has the form of an egg and is designed to form a nest-egg. This body is hollow and is preferably formed of rubber, so as to be elastically yieldable, there being an opening 2 formed in the butt-end of the body and designed for the introduction of an insecticide, and a considerable portion of the body is provided with a plurality of perforations 3, designed for the discharge of a powdered insecticide.

Within the body and projected from the walls of the filling-opening 2 is a tubular socket 4, which is open at opposite ends and is normally closed by means of a hollow plug 5, which is inserted through the outer open end of the socket and has its inner end closed, as at 6, so as to effectually close the inner end of the socket. The outer end of this closure-plug is open and also provided with an outwardly-directed and flared marginal flange 7 to fit snugly the exterior of the body and limit the inward movement of the plug, said flange being formed to lie close to the body and to obviate external projections. In the outer side of the plug and adjacent to the inner side of the flange there is provided a marginal groove or seat 8, into which the marginal edge of the opening 2 is designed to snap when the plug is inserted into the socket and has assumed its final position, whereby the plug is held against accidental outward displacement.

It is designed to have the hollow or tubular plug packed with cotton or other absorbing material 9, which is inserted through the outer open end of the plug and is to be thoroughly saturated with a suitable liquid insecticide the fumes of which are capable of destroying or driving away such vermin or insects as infest the bodies and nests of domestic fowls.

Prior to the application of the closure-plug a suitable powdered insecticide 10 is introduced into the body of the container and through the filling-opening and tube 4, after which the plug is applied to prevent displacement of the powder in large quantities. In view of the shape of the container it may be employed in the capacity of an ordinary nest-egg, and by reason of its elastically-yieldable nature it will be compressed by the movement of a fowl upon its nest, whereby the powdered insecticide will be automatically displaced or discharged automatically through the small perforations, and thereby conveniently and effectually applied directly to the nest and body of the fowl without interfering with the latter in any manner whatsoever. After any compression of the container-body it will assume its normal shape, due to its elastic nature, whereby said container is always in condition to be compressed for expelling the insecticide. The fumes from the liquid insecticide held by the absorbent material are given off through the outer open end of the closure-plug, so as to directly attack the body and nest of the fowl. It is preferable to have the liquid held by an absorbent material, as there is then no possibility of any great quantity of the liquid being discharged at any one time to the annoyance of the fowl and damage to the nest and eggs.

The purpose of having both a powdered insecticide and a liquid insecticide carried by the same nest-egg is to provide for an intermittent application of the powdered insecticide to the nest and the body of the fowl by movements of the latter and to provide for a continuous application of the fumes of a liquid insecticide, which may have the same or different properties from those of the powdered insecticide.

From the foregoing description it will be apparent that the present invention provides an exceedingly simple, efficient, and inexpensive means for applying an insecticide to the body and nest of a fowl and is embodied in such a shape as to form a nest-egg, so that an insecticide may be conveniently applied without interfering with or disturbing a fowl, and in view of the elastically-yieldable nature of the container the insecticide is automatically expelled and applied directly to the fowl and its nest without any further attention after the device has once been placed in a nest.

What I claim is—

1. As a new article of manufacture, a hollow, elastic, perforate nest-egg.

2. A vermin-destroying nest-egg, consisting of a perforate hollow, elastically-yieldable body, having a normally closed filling-opening for the introduction of an insecticide.

3. A vermin-destroying nest-egg, comprising a hollow, elastically-yieldable and perforate body having a filling-opening, and a closure for the opening and provided with a marginal seat for the reception of the edges of said opening to prevent accidental displacement of the closure.

4. A vermin-destroying nest-egg having an opening formed therein, a hollow plug removably fitted in the opening and projected into the interior of the body, the inner end of the plug being closed and the outer end thereof having an opening, and an absorbent material within the plug to hold a liquid insecticide.

5. A hollow perforate vermin-destroying nest-egg having a filling-opening for the introduction of an insecticide, and a hollow closure-plug removably fitted in the opening and projected into the interior of the device and also capable of containing an insecticide, the inner end of the plug being closed and the outer end thereof having an opening to permit of the escape of vermin-destroying fumes from the insecticide therein.

6. A hollow elastic perforate vermin-destroying nest-egg having a filling-opening for the introduction of an insecticide, a hollow closure-plug removably fitted in the opening and projected into the interior of the body, the inner end of the plug being closed and the outer end having an opening, and absorbent material within the plug to hold a liquid insecticide.

7. A vermin-destroying nest-egg, comprising a hollow elastic perforate egg-shaped body, a powdered insecticide contained within the body and capable of being intermittently discharged through the perforations thereof by pressure upon the body, and means for containing a liquid insecticide within the body and for giving off the fumes of the insecticide to the exterior of the body.

In testimony that I claim the foregoing as my own I have hereto affixed my signature in the presence of two witnesses.

EDWIN THOMAS STUART.

Witnesses:
CARL POUCK,
LEWIS HASHMUNE.